2,887,459

MIXED RESINOUS ESTERS OF OIL-MODIFIED ALKYD RESINS AND OF PARTIALLY-ESTERIFIED EPOXIDE RESINS

Raymond F. Carmody, Metuchen, N.J., assignor to Socony Mobil Oil Company, Inc., a corporation of New York No Drawing. Application October 17, 1955
Serial No. 541,075

20 Claims. (Cl. 260—22)

This invention relates to new synthetic drying compositions and more particularly to new alkyd resins possessing excellent drying characteristics and to drying compositions such as varnishes, etc. containing such resins and adapted to form insoluble and infusible protective coatings under the influence of air oxidation and/or heat treatment.

The alkyds of the present invention are condensation products of one or more drying oils or drying oil fatty acids, phthalic anhydride, a polyhydric alcohol such as glycerin or pentaerythritol and an epoxide resin derived from 4,4'-dihydroxy-diphenyl-2,2-propane.

Alkyd resins have found wide use as protective coating compositions because of their many desirable properties such as rapid dry, excellent adhesion, good flexibility, surface hardness and resistance to marring. The usual type of alkyd resins used by the paint and varnish industry are phthalic acid esters of such alcohols as ethylene glycol, glycerol, pentaerythritol, trimethanol ethane and sorbitol. These esters are modified with vegetable oil or with vegetable oil fatty acids which may contain from 6 to 22 carbon atoms per molecule and unsaturated olefinic linkages of the conjugated and non-conjugated type.

The physical properties of an alkyd resin are profoundly effected by the type of polybasic acid and the particular alcohol incorporated with the vegetable oil and/or vegetable oil fatty acids. The viscosity of an alkyd resin system varies directly with the molecular weight of the phthalic ester, while the cure or drying time varies inversely. It is therefore usually desirable to form the highest molecular weight phthalic ester possible at any given oil percent. The limit to the molecular weight of the phthalic ester is that point at which the molecule becomes three dimensional or cured. This condition is known as gelation.

I have discovered that controlled quantities of a high molecular weight epoxide resin containing a plurality of reactive hydroxyl groups may be condensed with alkyd resin compositions in critical quantities to increase the average molecular weight of the resin without gelation. This is quite surprising in view of the high functionality of the epoxide resins.

The epoxide resins employed in my invention have terminal epoxide groups which will react with carboxylic acids to form hydroxy esters. In addition, these epoxide resins contain a number of unreacted secondary aliphatic hydroxyl groups in the molecule that will react readily with organic acids. It would be expected therefore that this highly functional epoxide resin would cross-link the alkyd resin molecule to produce insoluble infusible gels. I have now discovered that the functionality of these epoxide resins can be accurately controlled by esterifying the epoxide groups and some of the hydroxyl groups with a predetermined quantity of fatty or resin acid. Moreover the epoxide partial esters so formed are compatible with alkyd resins and therefore readily condense with alkyd resin components to form an integrated complex resinous structure.

The new drying compositions are condensation products of synthetic unsaturated ester compositions made by pre-esterifying an epoxide resin with a controlled amount of drying oil fatty acids. This partially esterified epoxide resin containing a predetermined number of hydroxyl groups per molecule is then condensed by heating with phthalic anhydride and the other components of the desired alkyd resin. It is believed that during the condensation step there is some reaction between the carboxylic acid groups of the dibasic acid present in the alkyd resin with the hydroxyl groups of the epoxide resin. In any event the epoxide ester is readily condensed with the alkyd resin to form a complex condensation product of improved physical structure.

The epoxide modified alkyds provided by the invention are liquids when prepared, but readily undergo drying, for example solidification and hardening under exposure to air. They are soluble or compatible with drying oils and with the usual varnish solvent such as toluene, xylene or mineral spirits. Varnishes prepared by dissolving the alkyds in the usual varnish solvents spread well and dry quite rapidly to form tack-free, hard clear film which are fairly flexible and which adhere tightly to the supporting surface, for example wood or metal, etc. on which they are formed. The dried film of these proved alkyd resins are quite resistant to marring and are exceptionally resistant to aqueous solutions of soap or alkalis.

The base alkyd resin

Conventional alkyd resins may be modified by the process of my invention. Such resins may contain varying proportions of phthalic anhydride, referred to in the art as long, medium or short oil alkyds, and such resins may be prepared from drying, semi- or non-drying oils by the well known alcoholysis procedure, or fatty acids may be employed. Examples of the aforesaid oil components of the alkyd resins which may be employed are: linseed oil, soy bean oil, dehydrated castor oil, coconut oil, tung oil or oiticica oil. The fatty acids derived from these oils may also be employed. Linseed oil or soya bean oil or a mixture thereof is preferably employed in making the base alkyds of the invention.

In making the base alkyd resins of the present invention, I employ phthalic anhydride as the polycarboxylic acid.

Although any saturated aliphatic polyhydric alcohol having at least three hydroxyl groups in the molecule may be used in formulating the base alkyd resin; pentaerythritol, glycerin, or a mixture of the two is usually employed. A portion or all of the alcohols may be esterified with one or more of the aforementioned fatty acids prior to carrying out the reaction for formation of the alkyd.

The phthalic anhydride may be present in from about 20% to 45% of the total weight of all ingredients of the base alkyd resin. A drying oil is usually employed in the starting mixture, but an equivalent amount of fatty acid and polyhydric alcohol may be substituted therefor. The oil in the base alkyd resin should be present in an amount not exceeding 65% of the combined weight of the several reactants. The minimum amount of oil should not be appreciably less than 35% by weight. This limitation applies, regardless of whether an oil be added as such, or in the form of glycerin and oil acids capable of reacting together to form an oil.

The mixture of polyhydric alcohols must be present in an amount sufficient to provide at least one hydroxy group for each carboxylic acid radical. In practice the alcohols are usually employed in an amount exceeding by at least 5% the proportion theoretically required for complete esterification of all the carboxylic acids in the mixture.

The above mentioned starting materials, in the relative proportions just stated may be mixed with one another and reacted together in any of several orders. The conventional procedure is to heat the oil together with the polyhydric alcohol in the presence of a transesterification catalyst such as lead oxide to effect ester exchange reactions and cause formation of esters of the oil acids with the several kinds of polyhydric alcohols present. Phthalic anhydride is then added to complete the reaction. Conversely, the oils may be replaced by fatty acids and an equivalent amount of glycerin or pentaerythritol.

The esterification reactions involved in preparing the base alkyd are usually carried out at temperatures of the order of 400° to 450° F. but they may be accomplished at lower, or somewhat higher temperatures, if desired.

An inert gas, such as nitrogen or carbon dioxide, may be bubbled through the reaction mixture during the esterification step to exclude air from the reaction vessel and to assist in the removal of the water vapor formed by the esterification reaction.

The base alkyd mixture is sampled from time to time during the reaction and the rate of cure and acidity determined in order to follow the progress of the reaction. The total time required to complete the reaction is usually in the order of from 4 to 8 hours.

THE EPOXIDE MODIFIED ALKYD RESIN

The epoxide modified alkyd resin may be produced by adding a partial ester of the epoxide resin either prior to or simultaneous with phthalic anhydride. While as little as 1% by weight of the epoxide resin markedly improved the drying time of the finished composition, I prefer to add from about 5% to 12% of the epoxide resin solids based on the weight of resin solids in the base alkyd resin. An increase in the proportion of the epoxide resin relative to the base alkyd resin has the effect of reducing the proportion of oil or oil acids which must be present in order to avoid gelation.

The epoxide resin is added to the alkyd resin cook prior to, or simultaneously with, the phthalic anhydride. The epoxide resins employed in my invention are made by reacting bisphenol (4,4'-dihydroxydiphenyl-2,2-propane) with epichlorohydrin or with glycerin dichlorohydrin in the presence of aqueous caustic alkali under regulated conditions as described in Greenlee Patents 2,615,007 and 2,694,694. The resins so obtained are polymeric polyether derivatives of 4,4'-dihydroxydiphenyl-2,2-propane containing terminal epoxide groups and containing an aliphatic secondary hydroxyl group on the intermediate chlorohydrin residues. These epoxide resins will have a softening point from about 80° C. to about 135° C. and an equivalent weight to esterification of from about 130 to about 200.

These epoxide resins, because of their high functionality would rapidly cross-link alkyd resins of the type described above with formation of insoluble and infusible gel structures. In order to control this reaction, I reduce the functionality of the epoxide resin by partially esterifying with a fatty or resin acid. The epoxide groups being more reactive than the secondary alcohol groups are first esterified to form hydroxy esters. Sufficient fatty acids are used to esterify at least about 40% of the available epoxide and hydroxyl groups; preferably from about 50% to about 70% of the functional groups are esterified. This partially esterified resin may then be added to the alkyd in amounts varying from between about 1% to 12% of the base alkyd resin solids (calculated on the epoxide resin content of the partial ester). The epoxide modified alkyd obtained is a pale yellow or light reddish-yellow liquid and is generally thinned with a solvent such as toluene, xylene, or mineral spirits prior to use. It is an advantage of my alkyd compositions that the viscosity does not drop sharply upon dilution with solvents. Varnishes having excellent brushing characteristics may be obtained at 35 to 40% solvents. Pigments may be incorporated with such varnish to obtain pigmented products. The varnishes and pigmented products may be applied to surfaces of woods or metals, etc. and dry rapidly to produce an extremely hard, resilient, protective film of especial alkali resistance.

The following examples describe in detail a number of specific compositions that will illustrate the present invention but these examples are not to be construed as limiting its scope. Examples 1 through 5 relate to partial esterification of various epoxide resins. Examples 6 through 14 describe in detail modified alkyd resins prepared in accordance with the present invention. In all examples the amounts are specified as parts by weight. The Gardner scale is used in reporting viscosity and color.

Example 1

| | Parts |
|---|---|
| Epoxide resin (equivalent weight 130) | 650 |
| Coconut oil fatty acids | 636 |

Six hundred and fifty parts of epoxide resin (having a softening point of 64° to 76° C. and an equivalent weight of 130) derived from bisphenol was heated with 636 parts of coconut oil fatty acids at 450° F. for 6½ hours. At the end of this time the acid number was 13. The heating was continued for an additional hour during which time the acid number dropped to 9.1. The total amount of water collected from the esterification reaction amounted to 54 parts. Approximately 50% of the total hydroxyl groups present in the original resin was esterified.

Example 2

| | Parts |
|---|---|
| Epoxide resin (equivalent weight 175) | 650 |
| Soy oil fatty acids | 636 |

A 60% soya oil fatty acid ester of an epoxide resin (softening at 95 to 105° C. and having an equivalent weight of 175) derived from bisphenol was prepared by the method of Example 1 above.

Example 3

| | Parts |
|---|---|
| Epoxide resin (equivalent weight 200) | 960 |
| Soy oil fatty acids | 815 |

Nine hundred and sixty parts (4.84 equivalents) of an epoxide resin (which softened at 145° to 155° C.) derived from bisphenol, was heated at 525° F. with 815 parts (2.9 equivalents) of soy fatty acids. After heating for 8 hours at 525° F. the acid number was less than 5. The ester so obtained was thinned to 44.5% solids with xylene.

Example 4

| | Parts |
|---|---|
| Epoxide resin (equivalent weight 175) | 1000 |
| Rosin | 1200 |

One thousand parts by weight (5.7 equivalents) of an epoxide resin softening at 95 to 105° C. and having an equivalent weight of 175, derived from bisphenol, was heated to 525° F. with 1200 parts by weight (3.94 equivalents) of rosin. At the end of nine hours the acid value of the reaction product was 23.8. This ester was diluted to 50% solids in xylene (viscosity "U"). Approximately 60% of the available hydroxyl groups in the epoxide resin was esterified. The total amount of water recovered from this reaction was 62 parts.

Example 5

| | Parts |
|---|---|
| Epoxide resins (equivalent weight 175) | 692 |
| Dehydrated castor oil fatty acids | 560 |

A dehydrated castor oil fatty acid ester of an epoxide resin (softening at 95 to 105° C. and having an equivalent weight of 175) derived from bisphenol, was prepared by the method of Example 1 above. The ester so obtained was thinned to 70% solids in xylene. The acid number was 7.7 and the viscosity $Z_2$–$Z_3$.

Example 6

| | Parts |
|---|---|
| Soya fatty acids | 22 |
| Soy oil | 1252 |
| Technical pentaerythritol | 286 |
| Dipentaerythritol | 26 |
| Partial ester of Example 2 | 410 |
| Lead oxide | 0.4 |
| Phthalic anhydride | 492 |
| Triphenyl phosphite | 4 |
| Fumaric acid | 10 |

The soy oil and soya fatty acids were heated with the pentaerythritol and partial epoxide ester at a temperature of 450° F. until the one part of the resin mixture was soluble in 2½ parts of methanol. This required approximately 1½ hours. The phthalic anhydride, triphenyl phosphite and fumaric acid were then added and the heating continued at 450° F. for an additional 3½ hours. At the end of this time 60 parts of water had been given off. The reaction product was thinned to 60% solids with mineral spirits having a kauri butanol value of 40 and boiling at about 315° to 380° F. The viscosity of the thinned resin was $Z_4$ to $Z_5$. The acid value of the finished resin was 7.5 and the color was 6. A base alkyd resin was made by the same procedure for comparison purposes omitting the epoxide ester of Example 2.

Example 7

| | Parts |
|---|---|
| Linseed fatty acids | 1.1 |
| Soya oil | 1058 |
| Glycerin | 340 |
| Lead oxide | 0.4 |
| Epoxide ester of Example 2 | 390 |
| Phthalic anhydride | 676 |
| Triphenyl phosphite | 4 |

The oil, glycerin and linseed oil fatty acids were heated with the lead oxide catalyst at 450° F. for about one hour at which time the solubility of the reaction mixture in methanol was one to four. The epoxide ester, phthalic anhydride and triphenyl phosphite were then added and the reaction was continued at 450° F. for an additional five hours. At the end of this time 84 parts of water had been given off and the acid number was 5.1. This resin, when thinned to 50% solids with mineral spirits, had a viscosity of $Z_1^+$ and a color of 6. A base alkyd resin was made by the same procedure for comparison purposes omitting the epoxide ester of Example 2.

Example 8

| | Parts |
|---|---|
| Linseed oil | 1160 |
| Technical pentaerythritol | 217 |
| Glycerin | 111 |
| Lead oxide | 0.4 |
| Epoxide resin of Example 2 | 405 |
| Phthalic anhydride | 584 |

The linseed oil, glycerin and pentaerythritol were heated to 450° F. in the presence of the lead oxide alcoholysis catalyst. At the end of one hour 1 part of the reaction product was soluble in four parts of methanol. Phthalic anhydride and epoxide ester were then added and the reaction mixture heated at 485° F. for two hours longer. At the end of this time the acid value was 4.8. This resin was cooled and thinned to 50% solids with a mixture of 15% xylene and 85% mineral spirits. The viscosity of the thinned resin was between $Z_4$ and $Z_5$. A total of 74 parts of water was given off during the reaction. A base alkyd resin was made for comparison purposes substituting a 5% phenolic resin modified linseed oil and omitting the epoxide resin.

Example 9

| | Parts |
|---|---|
| Soya oil | 968 |
| Glycerin | 252 |
| Lead oxide | 0.45 |
| Glycerin | 362 |
| Epoxide resin of Example 2 | 252 |
| Phthalic anhydride | 1068 |
| Triphenyl phosphite | 5 |

The soya oil was heated with 252 parts of glycerin at 450° F. until the solubility of the reaction product in methanol was 1 to 4. This required but one hour and 15 minutes. The epoxide ester, phthalic anhydride and additional glycerin were then added and the reaction was continued at 400° F. until the acid number dropped to 5.6. The additional heating time at 400° F. was 7 hours. This resin, when thinned to 50% solids with a mixture of 66% xylene and 34% mineral spirits, had a viscosity of $Z_6$ and a color of 5. One hundred and thirty parts of water were given off. A base alkyd was made by the same procedure for comparison purposes omitting the epoxide ester of Example 2.

Example 10

| | Parts |
|---|---|
| Soya oil | 968 |
| Glycerin | 252 |
| Lead oxide | 0.45 |
| Glycerin | 362 |
| Epoxide ester of Example 3 (44.5% solids in xylene) | 1300 |
| Phthalic anhydride | 1068 |

The soya oil, glycerin and alcoholysis catalyst were heated to 450° F. and held at that temperature until the reaction product had a solubility in methanol of 1 to 4, indicating completion of alcoholysis. Additional glycerin, phthalic anhydride and epoxide ester were then added and the temperature was gradually increased to 450° F. by distilling off xylene. The alcoholysis step required a little more than one hour. The total cooking time was 6½ hours. At the end of this time 824 parts of xylene and 130 parts of water had distilled out of the reaction mixture. The acid value was 9.4 and the viscosity at 50% solids in xylene was X–Y.

Example 11

| | Parts |
|---|---|
| Epoxide resin of Example 1 | 542 |
| Coconut oil fatty acids | 500 |
| Trimethylol ethane | 593 |
| Phthalic anhydride | 708 |
| Triphenyl phosphite | 2 |

A mixture of the above ingredients was heated together to 300° F. and the temperature raised from 300° F. up to 425° F. at the rate of one degree per minute. One-half hour was required to reach 300° F. and another 2 hours 5 minutes to reach 425° F. Heating was conducted at 425° F. for an additional 8 hours at which time the acid value was 6.7. This resin was thinned in mineral spirits to 55% solids and had a viscosity of Z+. The color of the resin was 5 and 131 parts of water were collected during the course of the reaction.

*Example 12*

| | Parts |
|---|---|
| Tung oil | 140 |
| Linseed oil | 440 |
| Glycerin | 254 |
| Rosin | 150 |
| Lead oxide | 0.5 |
| Epoxide resin ester of Example 4 (50% solids in xylene) | 592 |
| Rosin | 74 |
| Phthalic anhydride | 440 |
| Tung oil | 650 |

The mixture of tung oil and linseed oil was heated with 254 parts of glycerin and 150 parts of rosin at 450° F. in the presence of lead oxide until the one part of the reaction product was soluble in two parts of methanol. This required about 1½ hours. The phthalic anhydride was then added, followed by the epoxide ester of Example 4 and additional rosin. Heating was continued at 450° F. until the acid number dropped to 25.1 and 55 parts of water had been recovered from the reaction. Six hundred and fifty parts of tung oil were then added and the heating continued at 475° F. for 4½ hours. At this time 66 parts of water had distilled over and the acid value was 7.9. The finished resin was thinned to 50% solids with xylene to give a resin solution of U+ viscosity.

The soya oil, glycerin and linseed fatty acids were alcoholized by heating with lead oxide at 450° F. until one part of the reaction product was soluble in 4 parts of methanol. This required about 1½ hours. The vinyl toluene and tertiary butyl peroxide were then added over a one-hour period at 370° F. The phthalic anhydride, epoxide ester and triphenyl phosphite were then added and heating continued at 450° F. for an additional 4½ hours. At this time the acid was 9.6. The resin was thinned to 50% solids with mineral spirits boiling at about 280° F. and having a kauri butanol value of 35. The final viscosity was W-X and the color 4.

*Example 14*

| | Parts |
|---|---|
| Soya fatty acids | 22 |
| Soya oil | 1252 |
| Technical pentaerythritol | 286 |
| Dipentaerythritol | 26 |
| Lead oxide | 0.5 |
| Epoxide ester of Example 5 (70% solids) | 633 |
| Phthalic anhydride | 492 |
| Fumaric acid | 10 |
| Triphenyl phosphite | 4 |

The soya oil and fatty acids were heated with the polyhydric alcohols at 400° F. until one part of the reaction product was soluble in 2½ parts of methanol. This required about an hour and a half. The remainder of the reactants were then added and heating continued at 475° F. for an additional two hours. Sixty parts of water were recovered from the reaction mixture. The resin was thinned to 40% solids (viscosity Q+) and had an acid number of 13.2 and the color of 3.

A comparison of the epoxide alkyd resins of Examples 6 through 9 inclusive with (base alkyd) resins prepared under identical conditions but not containing the epoxide resin is given in Table I.

TABLE I.—PROPERTIES OF OIL MODIFIED ALKYD RESINS AND EPOXIDE MODIFIED ALKYD RESINS

| Example | 6 | | 7 | | 8 | | 9 | |
|---|---|---|---|---|---|---|---|---|
| Percent P.A. | 24.2 | 24.2 | 34.2 | 34.2 | 29.2 | 29.2 | 42.4 | 42.4. |
| Percent Oil | 62.0 | 62.0 | 53.3 | 53.3 | 58 | 58 | 38.4 | 38.4. |
| Type Oil | Soya | Soya | Soya | Soya | Linseed [a] | Linseed | Soya | Soya. |
| Percent Epoxide Resin | | 10 | | 10 | | 10 | | 5.2. |
| Temp | 450° F | 450° F | 450° F | 450° F | 450° F | 450° F | 400° F | 400° F. |
| Visc.[b] | U-W | $Z_4-Z_5$ | Z | $Z_1+$ | V | X-Y | $Z_3$ | $Z_6$. |
| Acid No. | 10 | 7.5 | 9.0 | 5.1 | 9.0 | 4.9 | 4.7 | 5.6. |
| Color [c] | 6 | 6 | 6 | 6 | 7 | 5 | 5 | 5. |
| Solvent [e] | M.S. | M.S. | M.S. | M.S. | M.S. | 15% Xylene, 85% M.S. | 66% Xylene, 34% M.S. | 66% Xylene, 34% M.S. |
| Cooking Time | | 5 hrs., 35 min. | 5 hrs., 10 min. | 6 hrs., 15 min. | 8 hrs. | 3 hrs., 57 min. | 7 hrs., 20 min. | 7 hrs., 55 min. |
| N.V.[f] | 60 | 60 | 50 | 50 | 50 | 50 | 50 | 50 |

[a] 5% modification phenolic resin.
[b] Gardner viscosity scale.
[c] Gardner (1933) color scale.
[e] M.S.=mineral spirits.
[f] Non-volatile content expressed as a percent of total.

*Example 13*

| | Parts |
|---|---|
| Linseed fatty acids | 1.1 |
| Soya oil | 1058 |
| Glycerin | 340 |
| Lead oxide | 0.4 |
| Vinyl toluene | 1000 |
| Ditertiary butyl peroxide | 20 |
| Epoxide ester of Example 3 (50% solids in xylene) | 716 |
| Phthalic anhydride | 676 |
| Triphenyl phosphite | 4 |

It will be noted that the epoxide modified alkyds exhibit uniformly higher viscosities than the standard unmodified resin. A greater degree of formulation flexibility is possible with the epoxide modified alkyds by varying the strength of the solvent used for reduction, thus one may obtain a low cost, low solids vehicle of brushing viscosity. Enamel and flat paint vehicles have been prepared from the long and medium oil bases by using solvents of kauri butanol values ranging from 90 to 25. When reduced to 35% non-soluble with mineral spirits, varnishes suitable for wood finishing were obtained. The reduction patterns of epoxide modified and standard alkyd resins is illustrated in Table II.

that standard and epoxide modified alkyds appear to be equal in gloss, chalking and clean-up.

TABLE II.—VISCOSITY REDUCTION PATTERNS OF EPOXIDE MODIFIED AND STANDARD ALKYDS

| | Solvent K.B. | 60 N.V. | Viscosity (Gardner Scale) | | |
|---|---|---|---|---|---|
| | | | 50 N.V. | 40 N.V. | 30 N.V. |
| Example 6: | | | | | |
| Standard 62% Oil | 25 | U | E-F | $A_2-A_1$ | $A_4-A_3$ |
| Epoxide 62% Oil | 25 | $Z_6-Z_7$ | $Z_3$ | R+ | $A_3-A_4$ |
| Standard 62% Oil | 40 | R+ | C-D | $A_3-A_4$ | |
| Epoxide 62% Oil | 40 | $Z_4-Z_5$ | W-X | F+ | $A_4-A_4$ |
| Standard 62% Oil | 100 | E+ | A+ | $A_3-A_4$ | |
| Epoxide 62% Oil | 100 | V- | I-J | A-B | |
| Example 7: | | | | | |
| Standard 53.3% Oil | 25 | Semi-Solid | $Z_5-$ | X-Y | F+ |
| Epoxide 53.3% Oil | 25 | Semi-Solid | $Z_5+$ | $Z_2+$ | U-V |
| Standard 53.3% Oil | 40 | $Z_2-Z_3$ | G-R | $A_2-A_1$ | |
| Epoxide 53.3% Oil | 40 | $Z_4$ | X-Y | I-J | |
| Standard 53.3% Oil | 100 | I-J | $A_1-A$ | $A_3-A_4$ | |
| Epoxide 53.3% Oil | 100 | Q-R | D-E | $A_3-A_1$ | |
| Example 8: | | | | | |
| Standard 58% Oil | 25 | Semi-Solid | $Z_4-Z_5$ | V- | C-D |
| Epoxide 58% Oil | 25 | Semi-Solid | $Z_6-Z_7$ | $Z_3-Z_3$ | T- |
| Standard 58% Oil | 40 | $Z_4-Z_5$ | V- | C-D | $A_3-A_4$ |
| Epoxide 58% Oil | 40 | Semi-Solid | $Z_4$ | U- | A-B |

The drying speed of the epoxide resin modified alkyds were considerably improved over the standard alkyd resins. The thru cure of the epoxide modified alkyd resins was far superior, especially during the early stages of drying, and a notable improvement is evident. Table III compares the drying time of epoxide modified alkyd resins with the base alkyd resins not so modified.

TABLE III.—DRYING TIME OF EPOXIDE MODIFIED VS. STANDARD ALKYDS

| | Set to Touch mins. | Tack Free | Print Free | Twist Free |
|---|---|---|---|---|
| Example 6: | | | | |
| 62% Oil Standard | 14 | 12 hrs. | 24 hrs. | |
| 62% Oil Epoxide Modified | 4 | 6 hrs., 14 mins. | 6 hrs., 14 mins. | 6 hrs., 34 mins. |
| Example 7: | | | | |
| 53.3% Oil Standard | 4 | 2 hrs., 54 mins. | 2 hrs., 54 mins. | 2 hrs., 54 mins. |
| 53.3% Oil Epoxide Modified | 4 | 1 hr., 41 mins. | 1 hr., 41 mins. | 1 hr., 41 mins. |
| Example 8: | | | | |
| 58% Oil Standard | 3 | 5 hrs., 3 mins. | 4 hrs., 12 mins. | 5 hrs. |
| 58% Oil Epoxide Modified | 3 | 2 hrs., 54 mins. | 2 hrs., 54 mins. | 2 hrs., 54 mins. |
| Example 9: | | | | |
| 38.4% Oil Standard | 6 | 49 mins. | 1 hr., 7 mins. | 1 hr., 7 mins. |
| 38.4% Oil 5% Epox. | 3 | 11 mins. | 49 mins. | 49 mins. |

Table IV summarizes the results of exposure tests which were continued for 500 hours in a weatherometer. The standard and epoxide modified alkyd resin appear to be about equal in gloss, chalking and clean-up.

TABLE IV.—WEATHEROMETER EXPOSURE RESULTS

| | Gloss Readings | | | | |
|---|---|---|---|---|---|
| | Initial | 50 Hrs. | 90 Hrs. | 200 Hrs. | 300 Hrs. |
| Example 6: | | | | | |
| 62% Oil Std | 95 | 75 | 65 | 36 | 20 |
| 62% Oil Epox. Mod | 91 | 76 | 69 | 36 | 15 |
| Example 7: | | | | | |
| 53.3% Oil Std | 90 | 70 | 55 | 29 | 15 |
| 53.3% Oil Epox. Mod | 92 | 66 | 62 | 38 | 19 |
| Example 8: | | | | | |
| 58% Oil Std | 95 | 72 | 56 | 29 | 14 |
| 58% Oil Epox. Mod | 92 | 70 | 64 | 36 | 18 |
| Example 9: | | | | | |
| 38.4% Oil Std | 95 | 68 | 60 | 41 | 18 |
| 38.4% Oil Epox. Mod | 87 | 75 | 63 | 40 | 19 |

Exposure was continued for 500 hours with the result

Table V compares the alkali resistance of standard alkyd resins with those modified by epoxide resin.

TABLE V.—ALKALI RESISTANCE 3% NaOH 68° F.

| | Time to Discolor | Time to First Film Defect | Time to Blister | Final Failure |
|---|---|---|---|---|
| Example 6: | | | | |
| 62% Oil Std | 4 min | 22 min | 49 min | 61 min. |
| 62% Oil Epox. Mod | 9 min | 52 min | 127 min | 180 min. |
| Example 7: | | | | |
| 53.3% Oil Std | 7 min | 22 min | 50 min | 180 min. |
| 53.3% Oil Epox. Mod | 19 min | 52 min | 180 min | (¹) |
| Example 8: | | | | |
| 58% Oil Std | 24 min | 66 min | (¹) | (¹) |
| 58% Oil Epox. Mod | 19 min | 81 min | (¹) | (¹) |
| Example 9: | | | | |
| 38.4% Oil Std | 9 min | 31 min | 54 min | 60 min. |
| 38.4% Oil Epox | 25 min | 54 min | | 180 min. |

¹ Discontinued at 300 min.

Table VI indicate that the adhesion and flexibility of the epoxide modified resins on metal surfaces are equivalent to that of standard alkyd formulations.

TABLE VI.—IMPACT TESTING OF EPOXIDE MODIFIED VS STANDARD ALKYDS

| | Failure Impact | Film Thickness, Mils |
|---|---|---|
| Example 6: | | |
| 62% Oil Std | 80 in./lbs. (Passes) | 0.6 |
| 62% Oil Epoxide Mod | 80 in./lbs. (Passes) | 0.8 |
| Example 7: | | |
| 53.3% Oil Std | 80 in./lbs. (Passes) | 0.8 |
| 53.3% Oil Epoxide Mod | 80 in./lbs. (Passes) | 0.8 |
| Example 8: | | |
| 58% Oil Std | 15 in./lbs. | 0.8 |
| 58% Oil Epoxide Mod | 80 in./lbs. (Passes) | 1.0 |
| Example 9: | | |
| 38.4% Oil Std | 17 in./lbs. | 0.6 |
| 38.4% Oil 5% Epoxide 1004 | 15 in./lbs. | 0.8 |

What I claim is:

1. A composition of matter comprising a resinous ester (I) of a vegetable oil-modified alkyd resin (II) of phthalic anhydride and a saturated aliphatic polyhydric alcohol having at least three hydroxyl groups per molecule, said resin (II) containing at least one hydroxyl group for each carboxylic acid group thereof and consisting of the elements carbon, hydrogen and oxygen, and of an epoxide resin (III), said epoxide resin (III) comprising partially esterified polymeric polyethers of 4,4'-dihydroxydiphenyl-2,2-propane and a chlorhydrin selected from the group consisting of epichlorhydrin and glycerin dichlorhydrin, said epoxide resin (III) containing terminal epoxide groups and secondary hydroxyl groups, at least forty percent of the available epoxide and hydroxyl groups thereof being esterified with an acid selected from the group consisting of a vegetable oil fatty acid, a rosin acid and mixtures of said acids; the weight of epoxide resin (III) prior to esterification with said vegetable oil-modified alkyd resin (II) to form said resinous ester (I) being from about one percent to twelve percent of the total resin solids.

2. A composition of matter comprising a resinous ester (A) obtained by reaction, at a temperature between about 300° F. and about 485° F. for a period of time between about 10½ hours and about 3 hours, of the mixture of ingredients comprising a polyhydric alcohol, vegetable oil fatty acids, phthalic anhydride and an epoxide resin (B) comprising partially esterified polymeric polyethers of 4,4'-dihydroxydiphenyl-2,2-propane and a chlorhydrin selected from the group consisting of epichlorhydrin and glycerin dichlorhydrin, said epoxide resin (III) containing terminal epoxide groups and secondary hydroxyl groups, at least forty percent of the available epoxide and hydroxyl groups thereof being esterified with a vegetable oil fatty acid; the weight of epoxide resin (B) prior to esterification with the aforesaid ingredients to form said resinous ester (A) being from about one percent to twelve percent of the total resin solids; from about 20 percent to 45 percent of the total weight of said polyhydric alcohol, vegetable oil fatty acids and phthalic anhydride being phthalic anhydride, from about 35 to 65 percent of said total weight being said vegetable oil fatty acids, and the quantity of said polyhydric alcohol being at least 5 percent in excess of that theoretically required for complete esterification of all carboxylic acid groups of said vegetable oil fatty acids and phthalic anhydride.

3. A composition of matter comprising a resinous ester (A) obtained by reaction, at a temperature between about 300° F. and about 485° F. for a period of time between about 10½ hours and about 3 hours, of the mixture of ingredients comprising a polyhydric alcohol, a vegetable oil, phthalic anhydride and an epoxide resin (B) comprising partially esterified polymeric polyethers of 4,4'-dihydroxydiphenyl-2,2-propane and a chlorhydrin selected from the group consisting of epichlorhydrin and glycerin dichlorhydrin, said epoxide (B) containing terminal epoxide groups and secondary hydroxyl groups, at least forty percent of the available epoxide and hydroxyl groups thereof being esterified with a vegetable oil fatty acid; the weight of epoxide resin (B) prior to esterification with the aforesaid ingredients to form said resinous ester (A) being from about one percent to twelve percent of the total resin solids; from about 20 percent to 45 percent of the total weight of said polyhydric alcohol, vegetable oil and phthalic anhydride being phthalic anhydride, from about 35 to 65 percent of said total weight being said vegetable oil, and the quantity of said polyhydric alcohol being at least 5 percent in excess of that theoretically required for complete esterification of all carboxylic acid groups of said vegetable oil and phthalic anhydride.

4. The resinous ester of claim 2 wherein the vegetable oil fatty acids are linseed fatty acids.

5. The resinous ester of claim 3 wherein the vegetable oil is linseed oil.

6. The resinous ester of claim 3 wherein the vegetable oil is soya oil.

7. An air drying composition comprising a resinous ester (A) of vegetable oil fatty acids, glycerin, phthalic anhydride and an epoxide resin (B) comprising partially esterified polymeric polyethers of 4,4'-dihydroxydiphenyl-2,2-propane and a chlorhydrin selected from the group consisting of epichlorhydrin and glycerin dichlorhydrin, said epoxide (B) containing terminal epoxide groups and secondary hydroxyl groups, at least forty percent of the available epoxide and hydroxyl groups thereof being esterified with an acid consisting of a vegetable oil fatty acid, a rosin acid and mixtures of said acids; the weight of epoxide resin (B) prior to esterification with said vegetable oil fatty acids, glycerine and phthalic anhydride to form said ester (A) being from about one to twelve percent of the total resin solids; from about 20 to 45 percent of the total weight of said vegetable oil fatty acids, glycerin and phthalic anhydride being phthalic anhydride, from about 35 to 65 percent of said total weight being said vegetable oil fatty acids, and the quantity of glycerin being at least 5 percent in excess of that theoretically required for complete esterification of all carboxylic acid groups of said oil fatty acids and phthalic anhydride.

8. An air drying composition comprising a resinous ester (A) obtained by reaction, at a temperature between about 300° F. and about 485° F. for a period of time between about 10½ hours and about 3 hours, of vegetable oil fatty acids, pentaerythritol, phthalic anhydride and an epoxide resin (B) comprising partially esterified polymeric polyethers of 4,4'-dihydroxydiphenyl-2,2-propane and a chlorhydrin selected from the group consisting of epichlorhydrin and glycerin dichlorhydrin, said epoxide (B) containing terminal epoxide groups and secondary hydroxy groups, at least forty percent of the available epoxide and hydroxyl groups thereof being esterified with an acid selected from the group consisting of a vegetable oil fatty acid, a rosin acid and mixtures of said acids; the weight of epoxide resin (B) prior to esterification with said vegetable oil fatty acids, pentaerythritol and phthalic anhydride to form said ester (A) being from about one to twelve percent of the total resin solids; from about 20 to 45 percent of the total weight of said vegetable oil fatty acids, pentaerythritol and phthalic anhydride being phthalic anhydride, from about 35 to 65 percent of said total weight being said vegetable oil fatty acids, and the quantity of pentaerythritol being at least 5 percent in excess of that theoretically required for complete esterification of all carboxylic acid groups of said oil fatty acids and phthalic anhydride.

9. A composition according to claim 1 in which the alkyd resin contains between about 20 percent to 45 percent by weight of phthalic anhydride.

10. A composition according to claim 7 in which the vegetable oil fatty acids are soya fatty acids.

11. A composition according to claim 8 in which the vegetable oil fatty acids are soya fatty acids.

12. A composition according to claim 7 in which the vegetable oil fatty acids are linseed fatty acids.

13. A composition according to claim 8 in which the vegetable oil fatty acids are linseed fatty acids.

14. A composition of matter obtained by heating at a temperature between about 300° F. and about 485° F. for a period of time between about 10½ hours and about 3 hours, whereby a resinous ester (I) is obtained, a mixture of ingredients comprising: (1) vegetable oil-modified alkyd resin (II) components comprising phthalic anhydride, a saturated aliphatic alcohol having at least three hydroxyl groups in the molecule, and a vegetable oil component selected from the group consisting of a vegetable oil and a fatty acid thereof, and (2) an expoxide resin (III) comprising partially esterified polymeric polyethers of 4,4'-dihydroxydiphenyl-2,2-propane and a chlorhydrin selected from the group consisting of epichlorhydrin and glycerin dichlorhydrin, said epoxide (III) containing terminal epoxide groups and secondary hydroxyl groups, at least forty per cent of the available epoxide and hydroxyl groups thereof being esterified with an acid selected from the group consisting of a vegetable oil fatty acid, a rosin acid and mixtures of said acids; the weight of epoxide resin (III) prior to esterification with (1) to form said ester (I) being from about one to twelve percent of the total resin solids; from about 20 to 45 percent of the total weight of ingredients (1) being phthalic anhydride, from about 35 to 65 percent of said total weight (1) being said vegetable oil component, and the quantity of said alcohol being at least 5 percent in excess of that theoretically required for complete esterification of all carboxylic acid groups of said ingredients (1).

15. A composition of matter comprising a resinous ester (A) obtained by heating, at a temperature between about 300° F. and about 485° F. for a period of time between about 10½ hours and about 3 hours, a mixture of ingredients comprising: (1) the alcoholysis product of glycerin and a vegetable oil, (2) phthalic anhydride, and (3) an epoxide resin (B) comprising partially esterified polymeric polyethers of 4,4'-dihydroxydiphenyl-2,2-propane and a chlorhydrin selected from the group consisting of epichlorhydrin and glycerin dichlorhydrin, said epoxide (B) containing terminal epoxide groups and secondary hydroxyl groups, at least forty percent of the available epoxide and hydroxyl groups thereof being esterified with a drying oil fatty acid; the weight of said epoxide resin (B) prior to esterification with (1) and (2) to form said ester (A) being from about one to twelve percent of the total resin solids; from about 20 to 45 percent of the total weight of ingredients (1) and (2) being phthalic anhydride, the vegetable oil component of said alcoholysis product (1) constituting from about 35 to 65 percent of said total weight of ingredients (1) and (2), and the quantity of glycerin being at least 5 percent in excess of that theoretically required for complete esterification of all carboxylic acid groups of said vegetable oil and phthalic anhydride.

16. A composition of matter comprising a resinous ester (A) obtained by heating, at a temperature between about 300° F. and about 485° F. for a period of time between about 10½ hours and about 3 hours, a mixture of ingredients comprising: (1) the alcoholysis product of pentaerythritol and a vegetable oil, (2) phthalic anhydride, and (3) an epoxide resin (B) comprising partially esterified polymeric polyethers of 4,4'-dihydroxydiphenyl-2,2-propane and a chlorhydrin selected from the group consisting of epichlorhydrin and glycerin dichlorhydrin, said epoxide (B) containing terminal epoxide groups and secondary hydroxyl groups, at least forty percent of the available epoxide and hydroxyl groups thereof being esterified with a drying oil fatty acid; the weight of said epoxide resin (B) prior to esterification with (1) and (2) to form said ester (A) being from about one to twelve percent of the total resin solids; from about 20 to 45 percent of the total weight of ingredients (1) and (2) being phthalic anhydride, the vegetable oil component of said alcoholysis product (1) constituting from about 35 to 65 percent of said total weight of ingredients (1) and (2), and the quantity of pentaerythritol being at least 5 percent in excess of that theoretically required for complete esterification of all carboxylic acid groups of said vegetable oil and phthalic anhydride.

17. Drying composition capable of hardening by air oxidation to form an insoluble and infusible protective coating, said composition being a resinous ester (I) of partially esterified polymeric polyethers (II) of 4,4'-dihydroxydiphenyl-2,2-propane and a chlorhydrin selected from the group consisting of epichlorhydrin and glycerin dichlorhydrin, said polyethers (II) containing terminal epoxide groups and secondary hydroxyl groups, at least forty percent of the available epoxide and hydroxyl groups being esterified with a mixture of vegetable oil unsaturated fatty acids, chemically combined with alkyd resin components consisting essentially of phthalic anhydride, a saturated aliphatic alcohol having at least three hydroxyl groups in the molecule, and a vegetable oil component selected from the group consisting of a vegetable oil and a fatty acid thereof, from about 20 percent to 45 percent of the total weight of said polyhydric alcohol, vegetable oil component and phthalic anhydride being phthalic anhydride, from about 35 to 65 percent of said total weight being said vegetable oil component, and the quantity of said polyhydric alcohol being at least 5 percent in excess of that theoretically required for complete esterification of all carboxylic acid groups of said vegetable oil component and phthalic anhydride; the weight of said polyethers (II) prior to esterification with said alkyl resin components to form said ester (I) being from about one to twelve percent of the total resin solids; said ester (I) being soluble in hydrocarbon solvents.

18. The method of making an improved alkyl resin (I) which comprises reacting together, at a temperature between about 300° F. and about 485° F. for a period of time from about 10½ hours to about 3 hours, (1) a vegetable oil-modified alkyl resin (II) of phthalic anhydride and a saturated aliphatic polyhydric alcohol having at least three hydroxyl groups per molecule, asid resin (II) containing at least one hydroxyl group for each carboxylic acid group thereof and consisting of the elements carbon, hydrogen and oxygen, with (2) an epoxide resin (III) comprising partially esterified polymeric polyethers of 4,4'-dihydroxydiphenyl-2,2-propane and a chlorhydrin selected from the group consisting of epichlorhydrin and glycerin dichlorhydrin, said epoxide resin (III) containing terminal epoxide groups and secondary hydroxyl groups, at least forty percent of the available epoxide and hydroxyl groups thereof being esterified with drying oil fatty acids; the weight of epoxide resin (III) prior to esterification with said alkyd resin (II) to form said resin (I) being from about one percent to twelve percent of the total resin solids.

19. The process of producing complex resinous condensation products of epoxide resins (A) containing from about one to twelve percent of a complex epoxide resin (B) comprising partially esterified polymeric polyethers of 4,4'-dihydroxydiphenyl-2,2-propane and a chlorhydrin selected from the group consisting of epichlorhydrin and glycerin dichlorhydrin, said epoxide resin (B) containing terminal epoxide groups and secondary hydroxyl groups, which comprises: reacting said epoxide resin (B) with an acid selected from the group consisting of a vegetable oil fatty acid, a rosin acid and mixtures of said acids, whereby at least forty percent of the available epoxide and hydroxyl groups of said resin (B) are esterified; and thereafter heating, at a temperature between about 300° F. and about 485° F. for a period of time from about 10½ hours to about 3 hours, the epoxide resin esters so obtained, with a mixture of alkyd resin components (C) consisting essentially of phthalic anhydride, a saturated aliphatic alcohol having at least three hydroxyl groups in the molecule, and a vegetable oil component selected from the group consisting of a vegetable oil and a fatty acid thereof; from about 20 percent to 45 percent of the total weight of said polyhydric alcohol vegetable oil component and phthalic anhydride being phthalic anhydride, from about 35 to 65 percent of said total weight being said vegetable oil component, and the quantity of said polyhydric alcohol being at least 5 percent in excess of that theoretically required for complete esterification of all carboxylic acid groups of said vegetable oil component and phthalic anhydride.

20. The method of making an improved alkyd resin (I) which comprises: reacting, at a temperature between about 300° F. and about 485° F. for a period of time from about 10½ hours to about 3 hours, together a drying oil, glycerol, phthalic anhydride and an epoxide resin (II), said epoxide resin (II) comprising esterified polymeric polyethers of 4,4'-dihydroxydiphenyl-2,2-propane and a chlorhydrin selected from the group consisting of epichlorhydrin and glycerin dichlorhydrin, said epoxide resin (II) containing terminal epoxide groups and secondary hydroxyl groups, at least forty percent of the available epoxide and hydroxyl groups thereof being esterified with a vegetable oil unsaturated fatty acid; the weight of said epoxide resin (II) prior to esterification, to form said alkyd resin (I), with said drying oil, glycerol and phthalic anhydride being from about one to twelve percent by weight of the total resin solids; from about 20 percent to 45 percent of the total weight of said drying oil, glycerol and phthalic anhydride being phthalic anhydride, from about 35 to 65 percent of said total weight being said drying oil, and the quantity of glycerol being at least 5 percent in excess of that theoretically required for complete esterification of all carboxylic acid groups of said drying oil and phthalic anhydride.

References Cited in the file of this patent

UNITED STATES PATENTS

| | | |
|---|---|---|
| 2,456,408 | Greenlee | Dec. 14, 1948 |
| 2,691,004 | Doyle | Oct. 5, 1954 |

UNITED STATES PATENT OFFICE
CERTIFICATE OF CORRECTION

Patent No. 2,887,459                                                    May 19, 1959

Raymond F. Carmody

It is hereby certified that error appears in the printed specification of the above numbered patent requiring correction and that the said Letters Patent should read as corrected below.

Column 3, line 72, for "1% to 12%" read -- 1% and 12% --; column 8, line 9, for "the acid was 9.6" read -- the acid value was 9.6 --; column 9, line 55, for "resin" read -- resins --.

Signed and sealed this 22nd day of September 1959.

(SEAL)

Attest:

KARL H. AXLINE                                                  ROBERT C. WATSON

Attesting Officer                                            Commissioner of Patents